July 14, 1953     W. N. GOODWIN, JR     2,645,756
THERMAL AMMETER
Filed Feb. 17, 1950
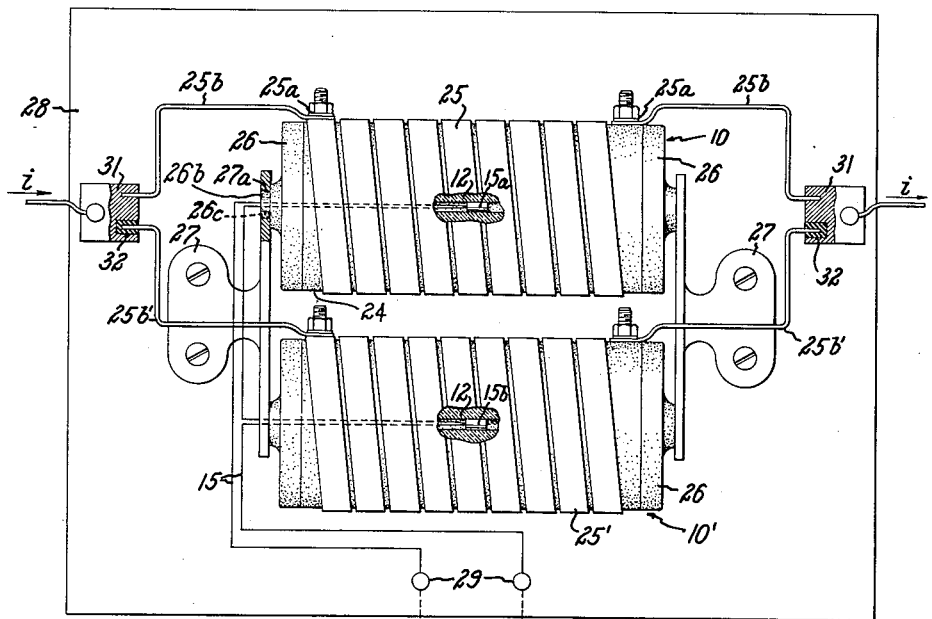
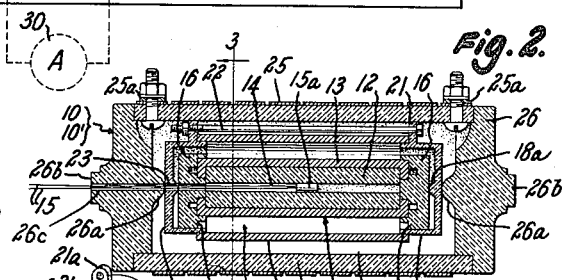
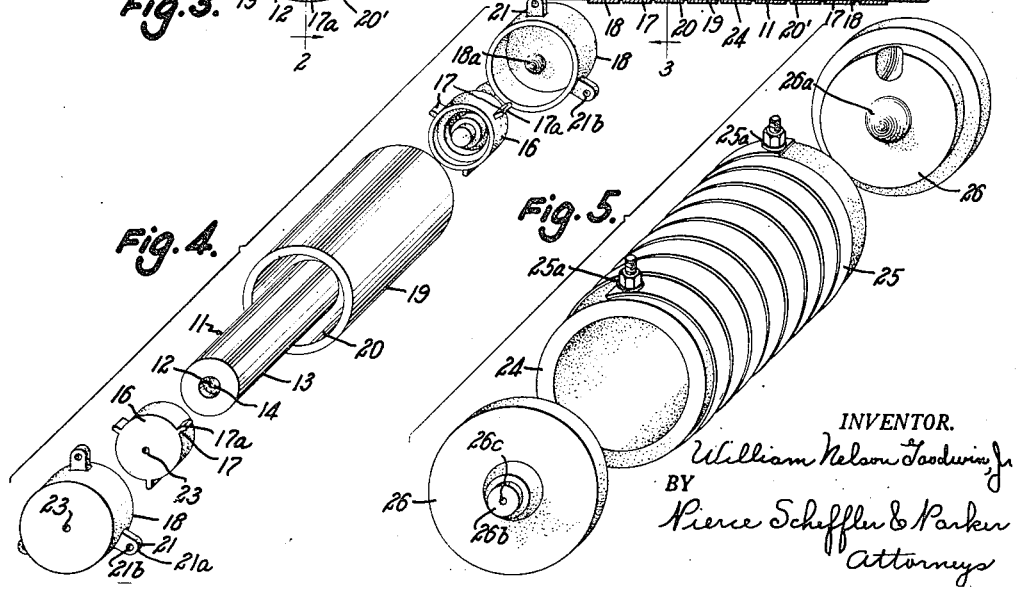
INVENTOR.
William Nelson Goodwin, Jr.
BY
Pierce Scheffler & Parker
Attorneys Patented July 14, 1953

2,645,756

UNITED STATES PATENT OFFICE 2,645,756

THERMAL AMMETER

William Nelson Goodwin, Jr., Newark, N. J., assignor to Weston Electrical Instrument Corporation, Newark, N. J., a corporation of New Jersey Application February 17, 1950, Serial No. 144,674

3 Claims. (Cl. 324—104)

The present invention relates in general to electrical meters and more particularly to those of the thermal type having a relatively long response time characteristic. Because the meter response can be made to track the heating characteristics of an associated electrical circuit or apparatus which may for example require about thirty minutes after the current is applied to reach 90% of its final temperature, the meter is especially suited for the measurement of current in power cables, transformers, motors, etc. which require a corresponding long time to heat. Such information is necessary because the maximum safe electrical loading of most electrical apparatus is directly related to its temperature rise above ambient and is limited by it.

Thermal meters of the type described include a heat storage unit which comprises a heat receiving element having a temperature responsive element therein, a heat transfer system surrounding the heat receiving element and a heater element such as a coil or the like surrounding the heat transfer system for supplying thermal energy to the system and which is energized either with the same load current as carried by the apparatus whose temperature is desired to be limited or, as is most likely to be the case, a current proportional to the load current. The heat receiving element and heat transfer system are so constructed that even for a constant current the temperature of the temperature responsive element does not reach the temperature of the heater element until after the desired long time delay and, for a fluctuating current, the temperature of the thermally responsive element within the unit is not a measure of an instantaneous value of the current but is a measure of the square root of the average square of the current over the long time delay period.

An object of the present invention is to provide an improved construction for the heat storage unit of a thermal meter comprised of a temperature responsive element surrounded by heat storage zones having a relatively high heat capacity alternating with heat insulating zones having a low heat conductivity.

A more specific object is to provide an improved heat storage unit for thermal meters featuring a central core made from material having a relatively large heat capacity and within which a temperature responsive element is placed, the core being surrounded by a tubular body also of large heat capacity and separated therefrom by an air space or other matter having a very low thermal conductivity. If desired the outer body of large heat capacity may in turn be surrounded by still other bodies of large heat capacity each separated from the other by an intervening zone of air or its equivalent in terms of heat transfer characteristic. However the principle is the same in both cases namely that of arranging a plurality of spaced layers or strata of masses having a large heat capacity, in the path of heat transfer between the source of heat and the thermally responsive meter element, and which are separated from one another by a zone of low heat conductivity.

Another object is to provide a thermal meter of the time lag type and which is made self-compensating for changes in ambient temperature through use of a "dummy" heat storage unit having the same heat transfer characteristic as the one with which the heater element is associated, and also containing a temperature responsive element, by which the meter indication is a function of the difference in temperature between the two temperature responsive elements.

Still another object is to provide an improved thermal meter constituted by a pair of adjacently disposed heat storage units only one of which has a heater unit associated therewith, the other serving as a "dummy" compensating for changes in ambient temperature, and a thermocouple unit for the temperature responsive element, the "cold" junction of the thermocopule being located in the "dummy" heat storage unit and the "hot" junction in the unit with which the heater unit is associated.

The foregoing as well as other objects and advantages will become more readily apparent from the following detailed description of the preferred structural embodiment of the invention and the accompanying drawings in which:

Fig. 1 is a top plan of the complete device;

Fig. 2 is a view in central longitudinal section of one of the heat storage units taken on line 2—2 of Fig. 3;

Fig. 3 is a transverse section taken on line 3—3 of Fig. 2; and

Figs. 4 and 5 are "exploded" views in perspective of the various components which when assembled make up one of the heat storage units.

Referring now to the drawing, the heat storage unit 10 includes a cylindrical core 11 having a relatively large heat capacity. The core may be made entirely from a metal or other material having a high specific heat such as one of the stainless steels or as illustrated in the drawing can be comprised of an inner glass tube 12 incased within a cylindrical shell 13 of polished stainless steel. Shell 13 may be spaced radially from tube 12 or as illustrated may be in direct surface contact with it. The "hot" junction 15a of a thermocouple unit 15 of conventional construction is located at the mid-point of the tube.

A cap 16 made of a material having a low heat conductivity such as a mineral filled aldehyde resin, for example "Bakelite," is fitted over each end of the core 11 and each cap has three symmetrically placed and radially extending projections 17 which round off to a line contact 17a parallel to the axis of the sub-assembly of caps 16 and core 11 to provide a heat deterrent line contact. These projections 17, placed 120° apart, serve to center the caps 16 within a set of hollow plugs 18 made from the same material as caps 16, and which fit snugly into the ends of an outer cylindrical tube 19 of polished stainless steel or other material having a large heat capacity. The inner core 11 and outer tube 19, both having high heat capacities and being coextensive in length, are thus separated from each other by an annulus 20 of air which has a very low heat conductivity. Plugs 18 are likewise provided with 120° spaced projections 21 which round off to a line contact 21a parallel to the axis of cylinder 19, and which are also apertured at 21b to receive tie bolts 22 which secure the plugs 18 within the cylinder 19. Cap 16 and plug 18 at the left end of the cylinder are provided with axial bores 23 aligned with bore 14 in the glass core 12 to pass the two wires of the thermocouple 15. Moreover, the inner faces of the outer plugs 18 are rounded at 18a to minimize the area in contact with the outer end face of caps 16 and thereby minimize heat transfer between the two.

The complete assembly of core 11, outer tube 19, caps 16 and plugs 18 fits snugly within another tube 24 and is centered therein by the three radially extending projections 21 which also establish another air space 20' between tubes 19 and 24. Upon tube 24 preferably of "Lava" or other ceramic is wound helically in ribbon form an electrically conductive coil 25 the ends of which are indicated at 25a. Coil 25 constitutes the heater unit and is adapted for use on direct current or single phase alternating current systems. For multi-phase systems the single coil 25 would of course be replaced by a plurality of coils each carrying a current proportional to its associated phase.

The ends of the ceramic tube 24 are closed by plugs 26 which may be of the same material as plugs 18. The inner faces of plugs 26 are rounded at 26a to minimize the transfer of heat to plugs 18 and their outer faces are provided with cylindrical bosses 26b that are adapted to enter correspondingly sized apertures 27a in end supports 27. Plug 26 at the left end of tube 24 also has a central bore 26c to pass the thermocouple wires.

The other heat storage unit 10' is identically the same construction and both units, held in spaced relation by the supports 27, are mounted on a suitable base 28.

Heat storage unit 10 contains the "hot" junction 15a of the thermocouple, and storage unit 10' contains the "cold" junction 15b. The thermocouple leads can be brought to terminals 29 on the base 28 for connection to a microammeter 30. Leads 25b from the ends of heater coil 25 can likewise be brought to another pair of terminals 31 on base 28 for connection to the source of heater current $i$.

Heat storage unit 10' constitutes the "dummy" and hence its dummy coil 25' if one is used remains unconnected, it being noted that while leads 25b' from the dummy coil 25' extend to terminals 31 in the same manner as leads 25b from coil 25 and are the same length to the end that the dummy storage unit will be structurally identical with the heated unit, the leads 25b' are electrically insulated from the conductive terminals 31 by means of insulator inserts 32. Practically in most cases however the "dummy" coil 25' will be unnecessary. Unit 10 is placed on base 28 above or along side of dummy unit 10' relative to the direction of flow of the natural convection cooling air currents produced by gravity, so that the "dummy" unit containing the "cold" junction of the thermocouple will be affected by ambient temperature only.

Dummy unit 10' not only provides a cold end for thermocouple 15 but also compensates for errors which would otherwise result from changes in ambient temperature, or space temperature variations in the interior of any case within which the complete device may be housed. This compensation is effective for both magnitude and time since the two heat storage units 10 and 10' being structurally identical are alike in both sensitivity to temperature and in response time. Therefore both units are affected exactly alike and in the same time by ambient changes, so that the thermoelectric forces balance exactly for all causes except of course for the heating of unit 10 by the current to be measured.

Operation of the device is believed to be generally apparent from the previous detailed description. Having oriented the base 28 so that as little as possible of the heat produced electrically by coil 25 is carried by convection currents over to the "dummy" unit 10', indicating instrument 30 can be connected as shown to the thermocouple leads and the current $i$ whose heating effect is desired to be registered can be connected to terminals 31.

Due to the special construction of the heat storage unit 10, a temperature change produced by the coil 25 will be delayed in reaching the "hot" junction 15a of the thermocouple since the heat path in a radially inward direction from coil 25 is composed of a plurality of zones having a relatively high heat capacity (these being the ceramic cylinder 24, metallic sleeve 19 and core 11) each separated from the other by a zone of low heat conductivity (these being the annular air spaces 20 and 20'). Heat transfer in the axial direction of each unit through the end members 26, 18 and 16 is retarded by the air spaces between them, the inherent heat deterrent characteristic of the material from which these end members are made and the minimum contact area of each with the other. The length of the delay is of course determined by the dimensions of the device and the number of alternating heat storage and heat deterrent zones employed.

As explained in the introduction, a thermal meter having a long time constant is useful in measuring the effective current which determines the temperature of various types of electrical apparatus. For example, in the transmission of power through cables, the power load is limited by the temperature rise of the cable and the cable temperature is a function of the product of the square of the current and the time is flows through the cable. When the current fluctuates, as is usually the case, in accordance with fluctuations in the power requirements, it becomes necessary to integrate the heating effects of the various current values in order to limit the true overall temperature rise in the cable. If for example cables on the average heat under constant current to about 90% of their final temperature in about thirty minutes, a thermal ammeter of the type which has been described designed for the same time constant can thus be used.

The voltage produced by thermocouple unit 15 and which is impressed upon the conventional microammeter 30 will therefore be representative not of any instantaneous value of the current passing through heater coil 25 but rather an integration of the current as regards its heating effect over the time lag constant of the heat storage unit 10. The thermocouple voltage thus becomes a measure of the cable temperature and the scale of the indicating instrument 30 could be calibrated in temperature if desired.

In conclusion, I desire it to be understood that while the herein described embodiment is preferred it is but typical of the many structural variations possible within the scope of the invention as defined in the appended claims.

I claim:

1. A heat storage apparatus for current meters of the type including an electrical measuring device, said heat storage apparatus comprising: a pair of structurally similar heat storage units each of which includes an inner heat storage cylindrical core member having a polished outer surface, an outer heat storage sleeve member disposed concentrically about said core member, said outer heat storage sleeve member being metallic and having a polished outer surface and end members having radial projections supporting said core and sleeve members in radially spaced relation, said radial projections serving to limit the thermal contact area between said core and sleeve members, said core and sleeve members having a relatively high heat capacity and said end members having a relative low heat conductivity; a thermocouple adapted to be connected to said measuring device, the hot junction of said thermocouple being disposed centrally within the core member of one of said heat storage units and the cold junction disposed centrally within the core member of the other of said heat storage units; and a heater coil surrounding the outer sleeve member of the heat storage unit containing the hot junction of said thermocouple and adapted to be traversed by the current to be measured.

2. Heat storage apparatus of the type defined in claim 1 and which further includes a non-heated coil of the same construction as said heater coil surrounding the outer sleeve member of the heat storage unit containing the cold junction of said thermocouple.

3. A heat storage unit for current meters of the type including an electrical measuring device, said heat storage unit comprising an inner core of electrical insulating material having a high heat storage capacity, a temperature responsive measuring element disposed within said core, a first metallic sleeve having a polished outer surface surrounding said core, a second metallic sleeve having a polished outer surface spaced from and surrounding said first sleeve, a third sleeve of electrical insulating material having a high heat storage capacity spaced from and surrounding said second sleeve, end members of electrical insulating material having a low heat conductivity disposed at the ends of said core and sleeves and closing said sleeves, said end members including projections supporting said sleeves in spaced relation and limiting the thermal contact area between said sleeves.

WILLIAM NELSON GOODWIN, Jr.

References Cited in the file of this patent

UNITED STATES PATENTS

| Number | Name | Date |
|---|---|---|
| 1,142,898 | Lincoln | June 15, 1915 |
| 1,957,051 | Norton | May 1, 1934 |
| 2,019,695 | Ross | Nov. 5, 1935 |
| 2,076,616 | Clarridge | Apr. 13, 1937 |

FOREIGN PATENTS

| Number | Country | Date |
|---|---|---|
| 621,211 | Germany | June 1, 1937 |
| 860,080 | France | Jan. 6, 1941 |

OTHER REFERENCES

Burgess et al., "Measurement of High Temperature," pages 151 and 153, 1912 (Photostat in Div. 60.). 136–4.77.

"Bur. of Stds. Bulletin," vol 10, 1914, page 335. 136–4.4S. (Photostat in Div. 60.)

"Industrial Heating," vol. 12, May 1945, pages 776, 136–4.4S and 778.

Clark, "Iron and Steel Eng'r," Feb. 1946, page 59, 136–4.77.